Jan. 8, 1957 E. HOYET ET AL 2,776,527
APPARATUS FOR GRINDING GLASS
Filed Oct. 5, 1954
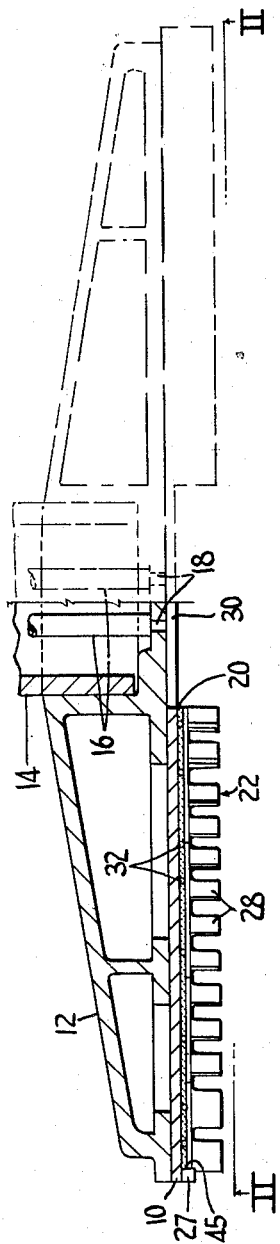
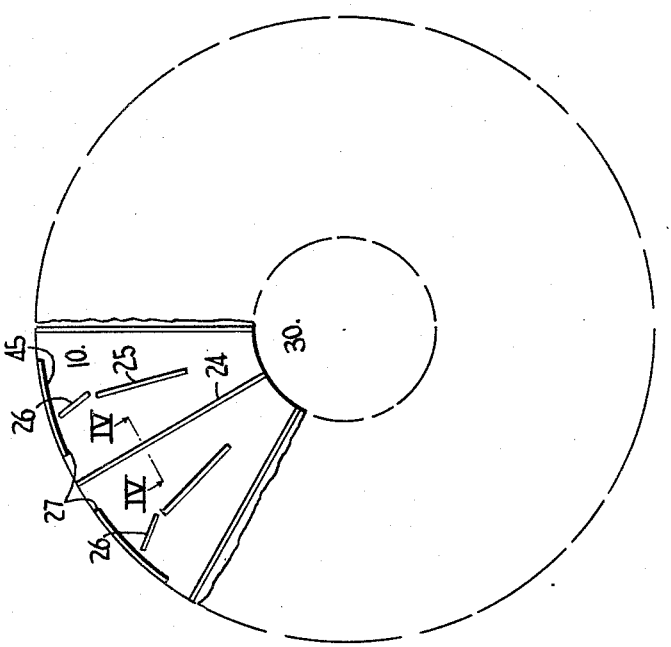
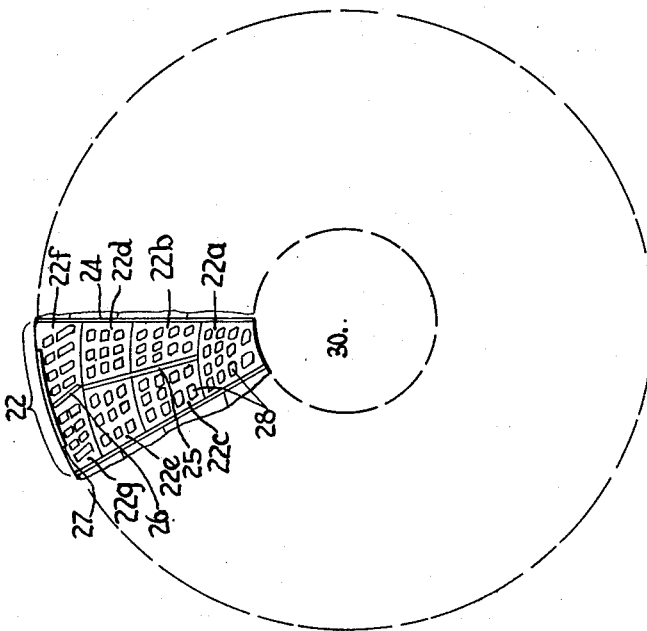
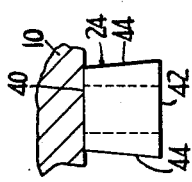
INVENTORS
EUGENE HOYET and
ETHMER J. HAZEN
Oscar L. Spencer
ATTORNEY

United States Patent Office 2,776,527
Patented Jan. 8, 1957

2,776,527
APPARATUS FOR GRINDING GLASS

Eugene Hoyet, Tarentum, and Ethmer J. Hazen, Ford City, Pa., assignors to Pittsburgh Plate Glass Company, Allegheny County, Pa.

Application October 5, 1954, Serial No. 460,426

9 Claims. (Cl. 51—209)

This application relates to apparatus for grinding glass, and in particular concerns certain structural refinements, particularly relating to the method of attaching a grinder runner to a steel deck of a glass grinding apparatus.

In the fabrication of polished plate glass, a ribbon of rough rolled glass is produced by conventional melting and fining of batch ingredients in a furnace to form molten glass, and passing the latter between a pair of forming rolls which shape the glass into the desired ribbon shape as it leaves the furnace. The glass ribbon or sheet is then conveyed through an annealing lehr where it is cooled as closely as possible to a desired cooling pattern. In order to improve the optical characteristics of the rough rolled glass so formed, it is necessary to surface the glass. This surfacing operation normally comprises passing the rough rolled glass past a series of grinders which wipe the glass surfaces with heavy abrasives by rotating thereagainst. The coarseness of the abrasive particles is gradually reduced as the glass continues its travel down the grinding line. The surfacing operation is concluded with a series of felt faced rotating polishers wiping a fine abrasive such as rouge against the glass surface. The present invention is limited to improvements in grinders used in the grinding phase of the surfacing operation.

Previously, grinders have been fabricated by attaching a heavy disc-like grinder runner comprising individual runner plates to a wooden deck by means of a large number of wood screws, usually in excess of one thousand. The wood, in turn, has been attached to a steel deck of a runner casting secured to one end of a rotatable shaft. The latter is coupled to a driving motor for rotating the casting about a vertical axis. Rotation of the shaft enables the grinder runner to rotate in a horizontal plane abutting one of the surfaces of the rough rolled glass. Means are provided for inserting abrasive into the interface between the glass and the grinder runner. Thus, the glass surface contacted by the rotating grinder runner has its high spots removed as a result of the shearing action of the rotating runner combined with the abrasive action of the abrasive against the glass.

Unfortunately, the grinder runners are also subject to wear upon exposure to the abrasive, although at a lesser rate than that of the glass. As the grinder runners wear out, replacement is required. With previous grinding apparatus, it is necessary to unscrew a worn out runner and then screw a replacement runner onto the wooden deck. This method of replacement involves considerable time. In addition, the grinder runners comprise several castings whose thicknesses may vary. When such castings are screwed onto a flat, wooden deck, it is necessary to compensate for these thickness variations by grinding the runners in sand for several hours before the new runners are ready to grind glass. In addition, the relatively thick wooden deck required for attaching the grinder runners limits the maximum thickness possible for the runner, due to space limitations in an already existing plant. This thickness limitation necessitates relatively frequent grinder runner replacements.

Another grinder structure used previously provides for attaching the grinder runner plates directly to the steel deck. This type of structure requires fine machining of the various metal parts in order to insure that the parts fit together accurately. Tappet holes in the grinder and the deck and bolts to attach the grinder runner plates to the deck through the tappet holes must be machined precisely. Thus, considerable expense rendered unnecessary by the present invention is involved in the fabrication of such runners. Furthermore, replacing spent runner plates from apparatus of this type also involves a tedious and time consuming task similar to that required for replacing runners onto wooden decks.

According to the present invention, replacement runners are attached to a steel deck by utilizing a cement mix of Portland cement and sand. Such a method of attachment avoids the necessity of grinding the runners in sand to eliminate thickness variations between runner castings, because the individual castings which comprise the grinder runner are adhered to cement and allowed to set on a slab with the grinding surface of the runners abutting a flat object until the runner castings set in the cement. Should it be required to remove an individual casting, a pneumatic jack hammer can break the bond between the casting and the cement without affecting the bond between the additional castings and the cement. Thus, each grinder runner replacement may be effected in a relatively short time compared to that required to remove and replace over a thousand bolts or screws. Also, the thickness of the bed of cement required to support the grinder runner onto the steel deck is much less than that previously required for the wooden deck and the strength of the cement bond is greater than that obtained by screwing the runners onto the deck. Thus, thicker grinder runners which require less frequent replacement may be used with cement bonding than with attachment by screws to a wooden deck.

Another advantage obtained by utilizing cement to bond the grinder runners to the steel deck is that failure of the bond between the runner and the cement is easily observed, whereas grinder runners bolted or screwed directly to steel or wooden decks may wobble considerably before the failure of the attachment is noted. This wobbling results in defects being imposed on the glass surface during the grinding operation. Such defects are virtually impossible to remove during the polishing phase of the surfacing operation. A considerable amount of glass may be spoiled by this type of wobbling before the defect or its cause is uncovered, whereas failure of the cement bond, if it occurs, is so obvious that it is recognized instantly, and operating personnel are alerted to take precautions to minimize the extent of glass loss.

A primary object of the present invention is to improve the efficiency of grinding operations in the production of polished plate glass by minimizing the glass loss due to inefficient attachment of the grinder runner to the deck.

Another object of the present invention is to provide in apparatus for grinding flat glass an improved method for attaching grinder runners to the grinder apparatus so that worn out grinder runners can be replaced more rapidly, more easily and less frequently than was possible with prior apparatus.

These and other objects will become evident upon study of the accompanying description taken in conjunction with the attached drawings.

In the drawings:

Figure 1 is a vertical cross-sectional view of a grinder showing the attachment structure between the grinder runner and the backing plate according to the present invention;

Figure 2 is a plan view of the grinding surface of a grinder runner along the lines II—II of Figure 1, showing the configuration of the grinder runner castings forming the grinder runner according to the present invention with certain parts shown in phantom;

Figure 3 is a plan view of the steel deck provided with wedge shape bars prior to cementing the grinder runners thereto:

Figure 4 is an enlarged sectional view of a wedge shaped bar along the lines IV—IV of Figure 3.

As seen in the drawings, the improved structure comprising our invention includes a steel deck 10 mounted on a runner casting 12 of substantially truncated shape. The casting is attached to a rotatable shaft 14 provided centrally with a number of feed tubes 16 for providing abrasive slurry. Outlet orifices 18 are provided at the lower end of the feed tubes 16 for depositing the abrasive slurry centrally of the grinder. The lower end of the steel deck 10 provides a substantially smooth surface to which cement 20 may be applied for securing grinder runner segments 22 thereto. Each grinder segment 22 is composed of seven individual grinder runner segment castings 22a, 22b, 22c, 22d, 22e, 22f and 22g, respectively. Each casting 22 has a number of lugs 28 which face the surface of the glass when the runner is on the surfacing line.

A number of dividing strips 24, which are wedge shaped in cross-section, extend radially and are attached by welding to the bottom surface of deck 10 to form a number of sectors, each adapted to receive a single grinder runner segment 22. Additional intermediate bars 25 and 26 serve as boundaries to help locate the individual runner castings properly. Wedge shaped circumferential strips 27 are similarly attached peripherally of the under surface of the steel deck 10 to provide a margin for the cement bed 20 and the outermost grinder runner castings 22f and 22g.

The steel deck 10 is cut way at its central portion 30 to enable the abrasive slurry to pass via the feed tubes 16 through the outlet orifices 19 to contact the surface of the glass passing adjacent the rotating grinders.

A number of spacer members 32, which may be ball bearings having a uniform diameter, are distributed throughout the cement matrix to insure that the runner blocks 22 are spaced from the backing plate 10 by a cement layer of sufficient thickness to insure an adequate bond. The spacing members prevent the cement layer, before it has set, from extruding to a thickness less than the diameter of the spacing members when the grinder runner and steel deck are pressed relatively toward each other. The presence of the uniformly thick spacer members in the cement matrix also minimizes canting of the grinder runner castings relative to the steel deck, since their presence insures a uniform thickness of cement bed 20 equalling that of the spacer members.

Referring now to Figure 4, wherein a cross-sectional view of a dividing strip 24 is shown, it is noted that the upper surface 40 of the dividing strip 24 which is attached to the bottom surface of the steel deck 10 has a smaller cross-section than the bottom surface 42. This enables the substantially vertical walls 44 to be sloped in such a manner as to provide a wedging action between the metal and the cement which tends to increase the strength of the bond between these two materials. Similarly, the substantially vertically extended inner wall 45 of each marginal strip 27 is also tapered for the same reasons. The presence of the dividing strips 24, 25, 26 and marginal strips 27 increases the surface of contact between the cement and the steel deck, thus improving the bond therebetween.

While various cementitious materials may be used in practicing the present invention, a particularly suitable cement has been found to be one composed of approximately equal parts by weight of Portland cement and sand containing sufficient additional water to form a workable mixture. Many other cements having high tenacity and quick setting properties may be substituted. A layer of cement 3/16 inch thick used in conjunction with a steel deck 10 having a thickness of 5/8 inch provides better bonding strength between the grinder runners 22 and the runner casting 12 than was previously possible using a wooden deck and wood screws.

The steel deck and cement layer having a total thickness of 13/16 inch has been substituted for a wood deck 2 inches thick, thus enabling the thickness of the grinder runner lugs 28 to be increased more than one inch. This effectively increases the life of the grinder runners considerably. In addition, the ease of replacement has enhanced the efficiency of operation compared to the difficulty experienced previously with wooden decks.

The runner blocks 22 may be attached to the steel deck in many ways using a cementitious interlayer to bind the metal parts together. One method is to invert the runner casting or truncated housing 12 so that the steel deck 10 faces upwardly, place the spacer members whose diameter equals the minimum thickness required for the cement onto the steel deck, mix and apply the wet cement, and lay the runner block segments 22 within the sectors formed by the dividing strips 24, 25 and 26, the marginal strips 27, and allow the cementitious interlayer to set.

Another method for attaching the runner blocks to the backing plate involves placing the individual runner block castings 22a through 22g on a flat surface in the position that they are expected to have when mounted on the deck, apply cement and spacer members to the top of the various segments, and lower the runner casting 12 with its steel deck 10 facing downwardly onto the cementitious layer 20 placed atop the runner blocks 22.

The particular embodiments of the present invention described hereinabove are for the purpose of illustration rather than limitation. The scope of the invention is contained in the appended claims.

What is claimed is:

1. In apparatus for surfacing flat glass comprising a rotatable shaft, a deck secured to one end of the shaft for rotation therewith, and a grinder runner having a surface suitable for grinding glass upon relative motion therewith attached to said deck, the improvement comprising a layer of cementitious material containing Portland cement as an essential ingredient attaching the grinder runner, at its surface opposite that desired for grinding the glass, to the deck.

2. The improvement recited in claim 1, wherein the cementitious material is composed of approximately equal parts by weight of Portland cement and sand to which is added sufficient water to form a workable mixture.

3. The improvement recited in claim 1, wherein a number of rigid spacing elements of equal thickness are imbedded throughout the cementitious material to prevent the thickness of the cementitious layer from becoming less than the thickness of the spacing members when the grinder runner is attached to the deck.

4. The improvement recited in claim 1 wherein the deck comprises a number of wedge shaped bars extending outwardly from the cement engaging surface of the deck to provide additional strength to the bond between the grinder runner and the deck.

5. The improvement recited in claim 4, wherein the grinder runner comprises a number of sectors, each divided into a number of runner segments, and the wedge shaped bars are spaced angularly to fit between individual runner segments.

6. In the fabrication of a grinder for use in abrading a surface of a sheet of rigid material, said grinder comprising a steel deck to which grinder runners are adapted to be attached, the method of attachment comprising cementing the surface of the grinder runner opposite that designed to face the material to be abraded by applying a layer of cementitious material having a thickness in excess of that required between the steel deck and the grinder runner surface, inserting a number of spacer members of equal thickness into said layer, and extruding the excess before the cementitious material has set.

7. A method of attaching a grinder runner bar to a steel deck having an attaching surface comprising locating the steel deck with its attaching surface facing upwardly, applying an excess of a slurry of cementitious material to said attaching surface, distributing a number of spacer members having a uniform thickness within the slurry, and placing a number of grinder runner segment castings having a smooth surface on one side and a number of lugs on the other with their smooth surface facing the slurry in such an arrangement that their lugs form a grinder runner surface, the weight of the castings extruding any excess of slurry, and allowing the slurry to set.

8. A method of attaching a grinder runner bar to a steel deck having an attaching surface comprising raising the steel deck with its attaching surface facing downwardly, arranging a number of grinder runner segment castings having a smooth surface on one side and a number of lugs on the other side with their lugs facing downwardly to form a grinder runner surface, applying an excess of slurry of cementitious material to the upper surface of the arranged castings, distributing a number of spacer members having a uniform thickness within the slurry, lowering the steel deck so that its attaching surface rests on the slurry, the weight of the steel deck extruding any excess of slurry, and allowing the slurry to set.

9. In apparatus for surfacing flat glass comprising a rotatable shaft, a metal deck secured to one end of the shaft for rotation therewith, and a metal grinder runner having a surface suitable for grinding glass upon relative motion therewith attached to said deck, the improvement comprising a layer of cementitious material containing a siliceous composition as an essential ingredient, attaching the grinder runner, at its surface opposite that desired for grinding the glass, to the deck.

References Cited in the file of this patent
UNITED STATES PATENTS

| | | |
|---|---|---|
| 1,898,012 | Hitchcock | Feb. 21, 1933 |
| 2,241,433 | Walker | May 13, 1941 |
| 2,353,864 | Wooddell | July 18, 1944 |